(12) United States Patent
Kim

(10) Patent No.: US 7,468,964 B2
(45) Date of Patent: Dec. 23, 2008

(54) BEACON SCHEDULING METHOD IN WIRELESS SENSOR NETWORK SYSTEM

(75) Inventor: Ji-tae Kim, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 417 days.

(21) Appl. No.: 11/271,843

(22) Filed: Nov. 14, 2005

(65) Prior Publication Data

US 2006/0104241 A1    May 18, 2006

Related U.S. Application Data

(60) Provisional application No. 60/626,880, filed on Nov. 12, 2004.

(30) Foreign Application Priority Data

Sep. 9, 2005    (KR) ...................... 10-2005-0084268

(51) Int. Cl.
*H04Q 7/00* (2006.01)

(52) U.S. Cl. ...................................... 370/329; 370/445

(58) Field of Classification Search ................. 370/229, 370/235, 329, 337, 445, 311, 336, 345, 469
See application file for complete search history.

(56) References Cited

U.S. PATENT DOCUMENTS

| 7,313,143 B1 * | 12/2007 | Bruno ..................... 370/395.4 |
| 2005/0030967 A1 * | 2/2005 | Ohmi et al. ................. 370/445 |

OTHER PUBLICATIONS

Brown, Monique, Project IEEE 802.15.4 Working Group for Wireless Personal Area Networks (WPANs), Motorola Labs, Sep. 2004.

* cited by examiner

*Primary Examiner*—Sam Bhattacharya
(74) *Attorney, Agent, or Firm*—Sughrue Mion, PLLC

(57) ABSTRACT

A beacon scheduling method of a router by a coordinator in a network system that includes the coordinator and at least one router, includes receiving an allocation request signal of a time period in which a beacon of the router is transmitted; determining the time period to be allocated to the router based on information relating to a time period allocation state; and transmitting information relating to the determined time period to the router. The beacon slots can be efficiently allocated and managed when the ZR joins or leaves the network. Therefore, it is possible to effectively prevent the beacon collisions between ZRs over the network.

11 Claims, 4 Drawing Sheets

Beacon Tx offset

BEACON COLLISION AREA

BEACON SCHEDULING METHOD IN WIRELESS SENSOR NETWORK SYSTEM

CROSS-REFERENCE TO RELATED APPLICATIONS

This application claims the benefit under 35 U.S.C. §119 (e) of U.S. Provisional Application No. 60/626,880 filed on Nov. 12, 2004 in the United States Patent and Trademark Office, and priority from Korean Patent Application No. 2005-84268 filed on Sep. 9, 2005 in the Korean Intellectual Property Office, the entire disclosures of which are incorporated herein by reference.

BACKGROUND OF THE INVENTION

1. Field of the Invention

Methods consistent with the present invention relate to a beacon scheduling method in a network system. More particularly, the present invention relates to a beacon scheduling method of a router to prevent beacon collisions in a network system.

2. Description of the Related Art

In a ZigBee network topology, nodes in a network system are classified to a ZigBee coordinator (ZC), a ZigBee router (ZR), and a ZigBee end device (ZE).

The ZC is on the top of a tree structure and manages the tree. The ZR is below the ZC and responsible to relay a beacon transmitted from the ZC to its child so that the tree structure can be expanded.

The ZE is at the bottom of the network topology. The ZE synchronizes using the beacon transmitted from the ZR and the ZC, and performs communication.

To form such a tree structure, ZRs need to relay beacons received from ZCs to their child. At this time, if the transmission point of the beacons is randomly selected by the ZRs, the beacons are subject to collisions at the child. These beacon collisions block the communications between the nodes.

FIG. 1 illustrates a conventional beacon scheduling method. According to ZigBee NWK v.0.92 (02130r9ZB_NWK_Network-Specification V092), in case that a ZR is connected as a child to a parent which regularly transmits beacons in the tree topology, the ZR schedules its beacons transmission by tracking the beacons of the parent prior to its beacon transmission to its child, and transmitting its beacons by intervals of a beacon Tx offset.

FIGS. 2A and 2B illustrate a problem of the conventional beacon scheduling method.

It is assumed that two children (child 1 and child 2) are connected to the same parent and receive beacons from the parent but do not know each other in their respective regions.

Referring first to FIG. 2A, as the child 1 and the child 2 cannot track beacons of the other, the same beacon Tx offset is used based on the beacons of the parent.

Referring to FIG. 2B, in the hatched area where the coverages of the child 1 and the child 2 overlap, the beacons from the child 1 and the child 2 are collided. As a result, any child within the overlapping region cannot receive the beacons from the child 1 and the child 2.

SUMMARY OF THE INVENTION

An aspect of the present invention is to provide a beacon scheduling method of a router to prevent beacon collisions in a network system.

A beacon scheduling method of a router by a coordinator in a network system that includes the coordinator and at least one router, includes: receiving an allocation request signal of a time period in which a beacon of the router is transmitted; determining the time period to be allocated to the router based on information relating to a time period allocation state; and transmitting information relating to the determined time period to the router.

The determining of the time period may include determining a Tx offset which corresponds to an allocable time period.

The allocable time period may be selected by excluding beacon time periods of other routers positioned under a parent of the router.

The Tx offset may be determined based on a time period in which the router receives a beacon.

The allocation request signal of the time period may include an address of the parent of the router.

The information relating to the determined time period may include the Tx offset.

The router may transmit a beacon after the Tx offset from the time period in which the router receives the beacon.

The beacon scheduling method may further include receiving a return notification signal of the allocated time period; and updating the information relating to the time period allocation state when the return notification signal is received.

The beacon scheduling method may further include transmitting an operation check signal at regular intervals to a router having the allocated time period; and updating the time period allocated to the router to an allocable time period when the operation check signal is not received from the router.

BRIEF DESCRIPTION OF THE DRAWING FIGURES

These and/or other aspects and advantages of the invention will become apparent and more readily appreciated from the following description of exemplary embodiments, taken in conjunction with the accompanying drawing figures of which:

DETAILED DESCRIPTION OF THE EMBODIMENTS

Figure 1:
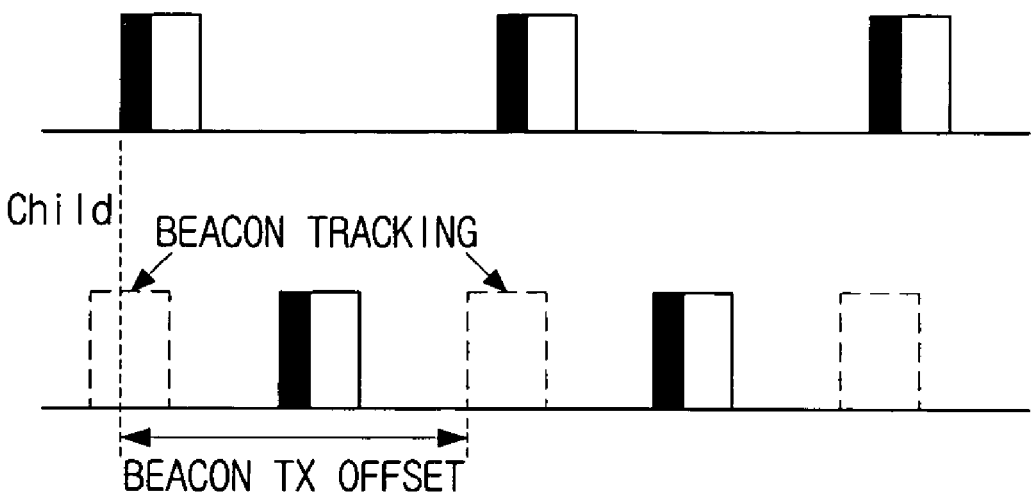
FIG. 1 illustrates a conventional beacon scheduling method.
Figure 2A:
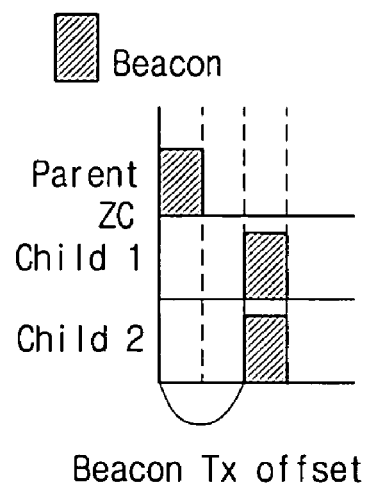
FIG. 2A and FIG. 2B illustrate[[s]] a problem of the conventional beacon scheduling method.
Figure 2B:
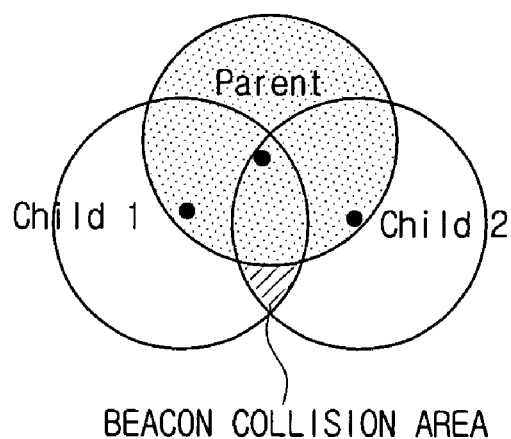

Certain exemplary embodiments of the present invention will now be described in greater detail with reference to the accompanying drawings.

In the following description, the same drawing reference numerals are used for the same elements even in different drawings. The matters defined in the description, such as detailed construction and element descriptions, are provided to assist in a comprehensive understanding of the invention. Also, well-known functions or constructions are not described in detail since they would obscure the invention in unnecessary detail.

Figure 3A:
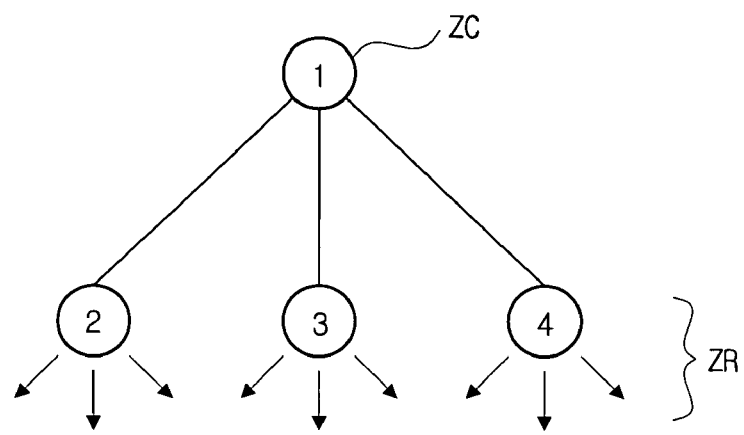
FIG. 3A illustrates a configuration of a network system adapting a beacon scheduling method according to one embodiment of the present invention.

FIG. 3A is a schematic diagram of a network system adapting a beacon scheduling method according to one embodiment of the present invention. Referring to FIG. 3A, a first node corresponds to a ZigBee coordinator (ZC) and is connected to a second node, a third node, and a fourth node.

The second node, the third node, and the fourth node correspond to a ZigBee router (ZR), and each needs to transmit beacons to their child at intervals. It is to be understood that child of the second node, the third node, and the fourth node may be a ZR or a ZigBee end device (ZE).

According to one embodiment of the present invention, the ZC holds information relating to a time period (beacon slot) where the beacons of all ZRs, which are children of the ZC, are delivered.

Figure 4:
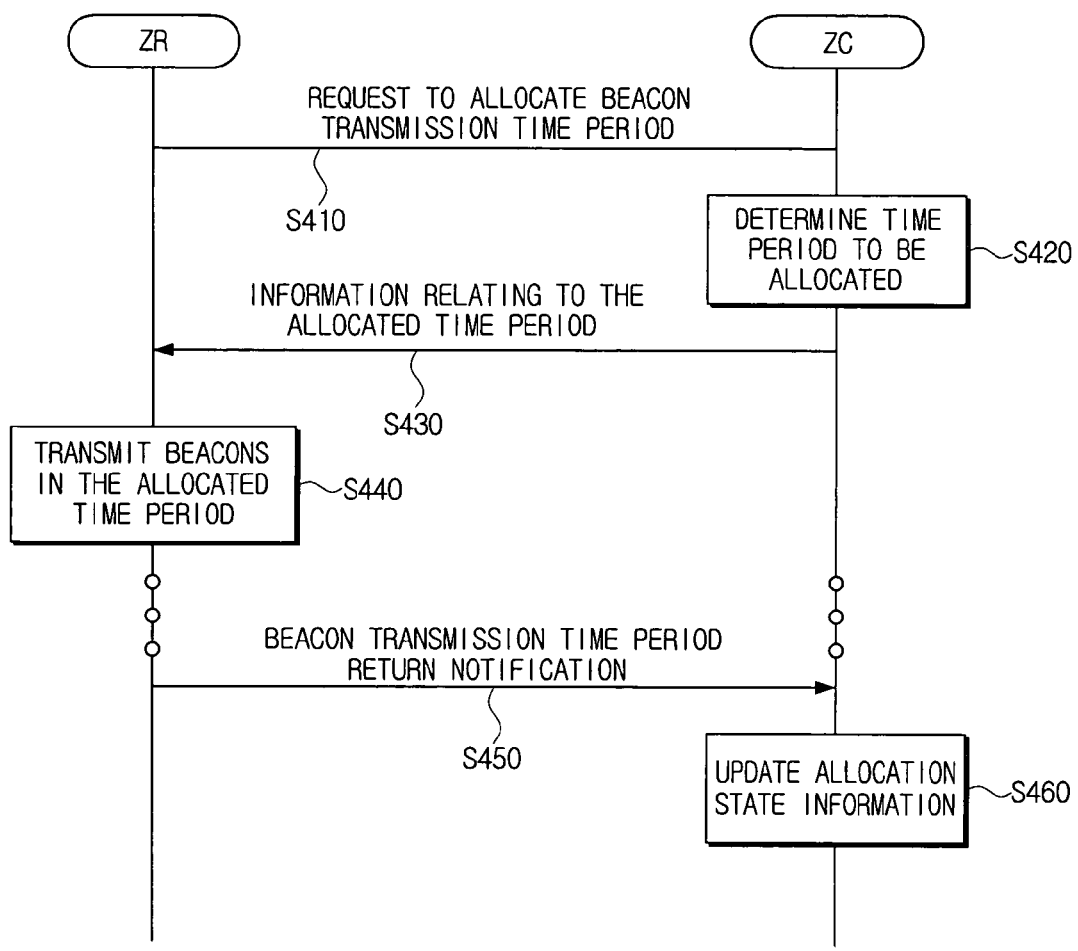
FIG. 4 illustrates a signal flow chart of the beacon scheduling method according to embodiments of the present invention.

FIG. 4 is a signal flow chart of the beacon scheduling method according to embodiments of the present invention.

Referring now to FIG. 3A and FIG. 4, the beacon scheduling method according to one embodiment of the present invention is elucidated below. In case that the second node joins as the child of the ZC, the second node signals to request the ZC to allocate a time period so as to transmit its beacon during the time period (S410).

In operation S410, the allocation request signal contains an address of the ZC as a destination address of the signal, and an address of the second node as a source address of the allocation request signal. The allocation request signal further contains the address of the ZC as the parent address of the second node being the ZR. The allocation request signal is delivered to the ZC according to its destination address. The ZC, receiving the allocation request signal, learns based on the source address that the allocation request signal originates from the second node.

Upon receiving the allocation request signal from the second node, the ZC determines a beacon transmission time period to be allocated to the ZR being the second node (S420).

When determining the beacon transmission time period in operation S420, the ZC checks based on the information relating to the parent of the second node which is contained in the allocation request signal whether there is a time period allocated to the third node and the fourth node other than the second node, excludes the allocated time periods of the third node and the fourth node, and selects a time period to be allocated to the second node from other available time periods.

The ZC determines a Tx offset by calculating an interval between the selected time period and the time period when the second node receives the beacon of the ZC. Next, the time period is assigned to the second node.

The ZC signals to the second node with information relating to the selected time period (S430). The time period information signal contains the address of the second node as the destination node, the address of the ZC as the source address, and the Tx offset.

The time period information signal arrives at the second node according to its destination address. The second node, receiving the time period information signal, confirms that it originates from the ZC based on the source address.

After receiving the information relating to the time period allocated from the ZC, the second node transmits its beacon based on the Tx offset contained in the time period information signal (S440). Specifically, the second node commences its beacon transmission in the time period at intervals of the Tx offset after the time period when the beacon signal is received from the ZC being its parent. Afterwards, the second node continues to transmit its beacons at intervals.

Meanwhile, in case that the ZR being the second node stops its operation, the ZR transmits a return notification signal of its allocated beacon transmission time period before stopping its operation (S450). The beacon transmission time period return notification signal contains the address of the ZC as the destination address, and the address of the second node as the source address.

The beacon transmission time period return notification signal is delivered to the ZC according to the destination address. Upon receiving the signal, the ZC confirms based on the source address that the beacon transmission time period return notification signal originates from the second node.

Next, the ZC updates its stored time period allocation state information (S460). Explicitly, the time period allocated to the second node is changed to an assignable state and the changed state is stored.

Figure 3B:
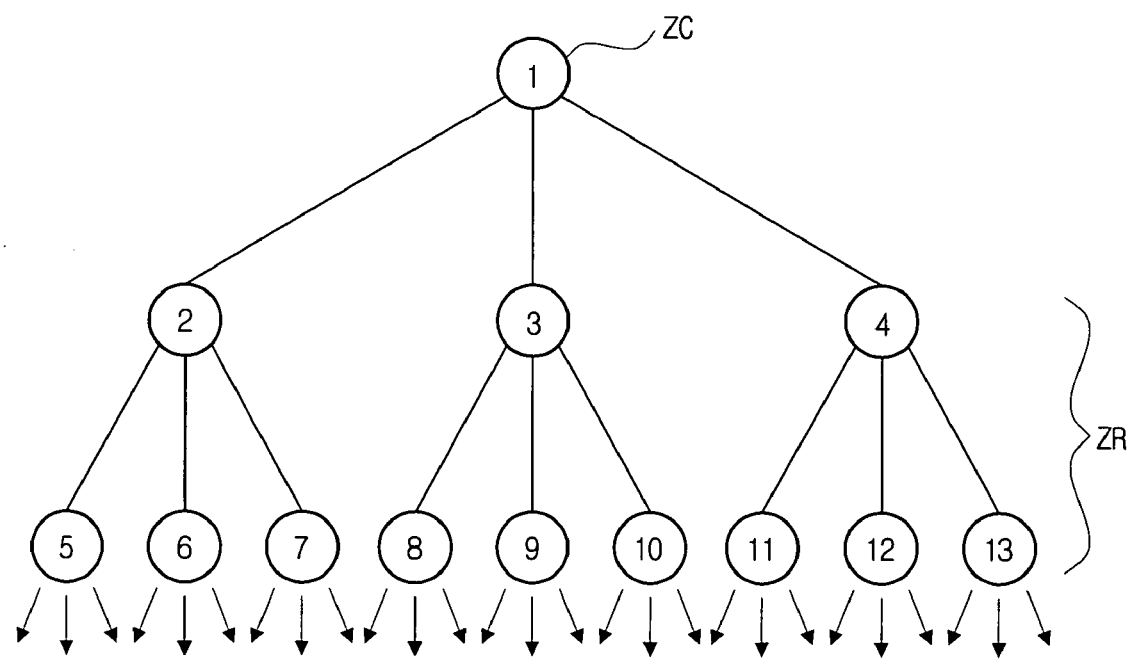
FIG. 3B illustrates a configuration of a network system adapting a beacon scheduling method according to another embodiment of the present invention.

FIG. 3B is a schematic diagram of a network system adapting the beacon scheduling method according to another embodiment of the present invention. Referring to FIG. 3B, a first node 1 corresponds to the ZC and is connected with a second node, a third node, and a fourth node.

The second node, the third node, and the fourth node correspond to the ZR. The second node is connected to a fifth node, sixth node and seventh node. The third node is connected to an eighth node, ninth node and tenth node. The fourth node is connected to an eleventh node, twelfth node and thirteenth node. The second node, the third node, the fourth node need to transmit beacons to their children at regular intervals.

Likewise, the fifth through thirteenth nodes are the ZR, and each is connected to their children. Hence, the fifth through thirteenth nodes need to transmit beacons to the children at regular intervals. The children of the fifth through thirteenth nodes may be a ZR or a ZE.

As mentioned early, the ZC holds information relating to the time period (beacon slot) where all ZRs being the children of the ZC transmit beacons. For example, in case that the fifth node newly joins the PAN of the ZC, the ZC holds information relating to the time periods where ZRs being the second node, the third node, the fourth node, the sixth node, and the seventh node transmit their beacons.

Referring to FIG. 3B, and FIG. 4, the beacon scheduling method according to another embodiment of the present invention is now elucidated. In case that the fifth node joins as the child of the ZC, the fifth node signals the ZC to request the allocation of the time period where its beacon is to be transmitted (S410).

In operation S410, the allocation request signal contains the address of the ZC as the destination address of the signal, and the address of the fifth node as the source address of the signal. The allocation request signal further contains the address of the second node as the parent address of the fifth node being the ZR. The allocation request signal finally arrives at the ZC via the second node according to its destination address. The ZC receiving the allocation request signal confirms from the source address that the allocation request signal originates from the fifth node.

Next, the ZC determines a beacon transmission time period to be allocated to the ZR corresponding to the fifth node (S420).

When determining the beacon transmission time period in operation S420, the ZC checks based on the information relating to the parent of the fifth node which is contained in the allocation request signal whether there are time periods allocated to the sixth node and the seventh node other than the fifth node of the second node being the parent, excludes the allocated time periods of the sixth node and the seventh node, and selects a time period to be allocated to the fifth node from other available time periods.

In another embodiment of the present invention, the ZC can check based on its stored time period allocation state information whether time periods are allocated to the eighth through thirteenth nodes that are children of the third and fourth nodes having the same parent (ZC) as the second node which is the parent of the fifth node.

After checking other time periods, the ZC can exclude the time periods allocated to the sixth through thirteenth nodes and select a time period to be allocated to the fifth node from the rest available time periods.

The ZC determines a Tx offset by calculating an interval between the selected time period of the fifth node and the time period where the beacon from the second node being the parent is received, that is, the time period allocated to the second node. The time period for the fifth node is allocated based on the determined Tx offset.

The ZC transmits to the fifth node the time period information signal determined in operation S420 (S430). The time period information signal contains the address of the fifth node as the destination node, the address of the ZC as the source address, and the Tx offset.

The time period information signal arrives at the fifth node via the second node according to its destination address. The fifth node, receiving the time period information signal, confirms from the source address that the received signal originates from the ZC.

Next, the fifth node transmits its beacons according to the Tx offset contained in the received time period information signal (S440). In more detail, the fifth node commences its beacon transmission in the time period at intervals of the Tx offset after the time period when the beacon signal is received from the second node being its parent. Afterwards, the second node continues to transmit its beacons at intervals.

Meanwhile, in case that the ZC being the fifth node stops its operation, the ZR transmits a return notification signal of its allocated beacon transmission time period before stopping its operation (S450). The beacon transmission time period return notification signal contains the address of the ZC as the destination address, and the address of the fifth node as the source address.

The beacon transmission time period return notification signal is finally delivered to the ZC via the second node according to its destination address. Upon receiving the signal, the ZC confirms based on the source address that the beacon transmission time period return notification signal originates from the fifth node.

Next, the ZC updates its stored time period allocation state information (S460). The updating denotes that the time period allocated to the fifth node is changed to an assignable state and the changed state is stored.

In case that a certain ZR does not transmit the time period return notification signal to the ZC before stopping its operation, the ZC cannot update the information relating to the time period allocated to the certain ZR.

Thus, the ZC transmits to the ZRs having the allocated time period an operation check signal which is to check whether they are in operation, at intervals based on the time period information. When the operation check signal is received from a certain ZR, it is recognized that the certain ZR is in operation and the time period of the certain ZR remains allocated.

By contrast, when the operation check signal is not received from a certain ZR over a time duration, the ZC determines that the certain ZR does not notified the time period return and that the certain ZR stops its operation. Next, the ZC update the time period allocated to the certain ZR to the allocable time period in the time period information.

As set forth above, the beacon slots can be efficiently allocated and managed when the ZR joins or leaves the network. Therefore, it is possible to effectively prevent the beacon collisions between ZRs over the network.

While the present invention has been particularly shown and described with reference to exemplary embodiments thereof, it will be understood by those skilled in the art that various changes in form and details may be made therein without departing from the spirit and scope of the invention as defined by the appended claims.

What is claimed is:

1. A beacon scheduling method of a router by a coordinator in a network system that includes the coordinator and at least one router, the method comprising:
receiving an allocation request signal of a time period in which a beacon of the router is transmitted;
determining the time period to be allocated to the router based on information relating to a time period allocation state; and
transmitting information relating to the determined time period to the router;
wherein the determining of the time period comprises determining a Tx offset which corresponds to an allocable time period; and
the Tx offset is determined based on the determined time period to be allocated and on time period in which the router receives a beacon from a parent of the router.

2. The beacon scheduling method of claim 1, wherein the allocable time period is selected by excluding beacon time periods of other routers positioned under the parent of the router.

3. The beacon scheduling method of claim 2, wherein the parent of the router is the coordinator.

4. The beacon scheduling method of claim 2, wherein the parent of the router is a router.

5. The beacon scheduling method of claim 1, wherein the allocation request signal of the time period includes an address of the parent of the router.

6. The beacon scheduling method of claim 1, wherein the allocation request signal of the time period includes an address of the router as a source address.

7. The beacon scheduling method of claim 1, wherein the information relating to the determined time period includes the Tx offset.

8. The beacon scheduling method of claim 7, wherein the router transmits a beacon after the Tx offset from the time period in which the router receives the beacon from the parent.

9. The beacon scheduling method of claim 1, further comprising:
receiving a return notification signal of the allocated time period; and
updating the information relating to the time period allocation state when the return notification signal is received.

10. The beacon scheduling method of claim 9, wherein the coordinator receives the return notification signal from the router and the return notification signal indicates that the router is no longer using the allocated time period.

11. The beacon scheduling method of claim 1, further comprising: transmitting an operation check signal at regular intervals to a router having the allocated time period; and
updating the time period allocated to the router to an allocable time period when the operation check signal is not received from the router.

* * * * *